(12) United States Patent
McDonald et al.

(10) Patent No.: US 7,451,557 B2
(45) Date of Patent: Nov. 18, 2008

(54) ARTICLE OF FOOTWEAR WITH A REMOVABLE MIDSOLE ELEMENT

(75) Inventors: Steven McDonald, Heber, UT (US); Bradley S. Long, Portland, OR (US)

(73) Assignee: Nike, Inc., Beaverton, OR (US)

( * ) Notice: Subject to any disclaimer, the term of this patent is extended or adjusted under 35 U.S.C. 154(b) by 315 days.

(21) Appl. No.: 10/862,056

(22) Filed: Jun. 4, 2004

(65) Prior Publication Data

US 2005/0268491 A1 Dec. 8, 2005

(51) Int. Cl.
*A43B 13/12* (2006.01)
*A43B 13/18* (2006.01)

(52) U.S. Cl. ............................... 36/100; 36/15; 36/105

(58) Field of Classification Search ............... 36/105, 36/28, 30 R, 31, 101, 15, 100
See application file for complete search history.

(56) References Cited

U.S. PATENT DOCUMENTS

| | | | |
|---|---|---|---|
| 997,657 A | 7/1911 | Drake | |
| 1,219,507 A | 3/1917 | Teare | |
| 3,373,510 A | 3/1968 | Memole et al. | |
| 3,538,628 A | 11/1970 | Einstein, Jr. | |
| 3,846,919 A | 11/1974 | Milotic | |
| 4,420,894 A | 12/1983 | Glassman | |
| 4,538,368 A | 9/1985 | Mugford | |
| 4,745,693 A | 5/1988 | Brown | |
| 4,825,563 A | 5/1989 | Strongwater | |
| 4,850,122 A | 7/1989 | Schwab, Jr. | |
| 4,887,369 A | 12/1989 | Bailey et al. | |
| 4,897,936 A * | 2/1990 | Fuerst | 36/30 A |
| 4,974,344 A | 12/1990 | Ching | |
| 5,083,385 A | 1/1992 | Halford | |
| 5,317,822 A * | 6/1994 | Johnson | 36/101 |
| 5,367,791 A | 11/1994 | Gross et al. | |
| 5,381,610 A | 1/1995 | Hanson | |
| 5,410,821 A | 5/1995 | Hilgendorf | |
| 5,533,280 A | 7/1996 | Halliday | |
| 5,661,915 A | 9/1997 | Smith | |

(Continued)

FOREIGN PATENT DOCUMENTS

BE 493654 6/1950

(Continued)

OTHER PUBLICATIONS

International Search Report in corresponding PCT Application, application No. PCT/US2005/019897, mailed Oct. 4, 2005.

*Primary Examiner*—Jila M Mohandesi
(74) *Attorney, Agent, or Firm*—Banner & Witcoff, Ltd.

(57) ABSTRACT

An article of footwear is disclosed that includes an upper, an outsole, and a midsole. The upper is configured to receive a foot, and the outsole is secured to the upper. The outsole defines a plurality of apertures extending entirely through the outsole. In addition, the outsole has a ground-engaging surface positioned at a first elevation. The midsole is separate from the upper and the outsole. The midsole is also positionable within the upper such that a lower surface of the midsole extends into the apertures of the outsole and is exposed by the apertures. The lower surface is at a second elevation, the first elevation being less than the second elevation.

25 Claims, 6 Drawing Sheets

U.S. PATENT DOCUMENTS

| | | |
|---|---|---|
| 5,799,417 A | 9/1998 | Burke et al. |
| 5,822,888 A | 10/1998 | Terry |
| 5,980,351 A * | 11/1999 | McCook .................... 446/26 |
| 5,991,950 A | 11/1999 | Schenkel |
| 6,023,857 A | 2/2000 | Vizy et al. |
| 6,023,859 A | 2/2000 | Burke et al. |
| 6,145,221 A | 11/2000 | Hockerson |
| 6,311,413 B1 * | 11/2001 | Chern et al. .................. 36/15 |
| 6,931,766 B2 * | 8/2005 | Greene ....................... 36/101 |
| 7,140,129 B2 | 11/2006 | Newson et al. |
| 2003/0051972 A1 | 3/2003 | Lyden |
| 2003/0069807 A1 | 4/2003 | Lyden |

FOREIGN PATENT DOCUMENTS

| | | |
|---|---|---|
| FR | 2 813 766 | 3/2002 |
| WO | WO 97/46127 | 12/1997 |
| WO | WO 2004/066771 | 8/2004 |
| WO | WO 2004/103105 | 12/2004 |

* cited by examiner

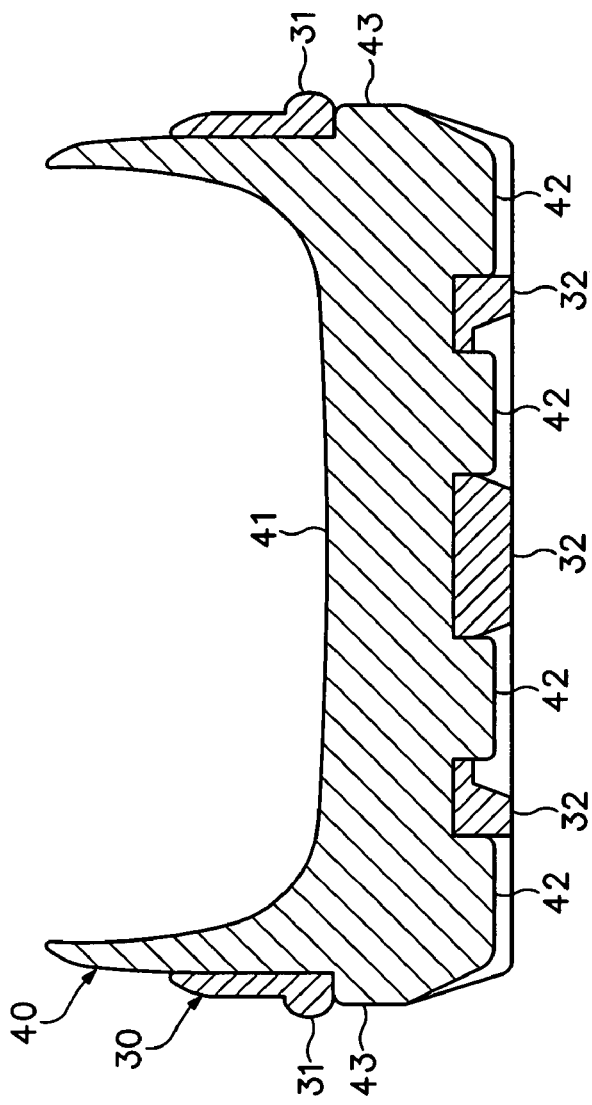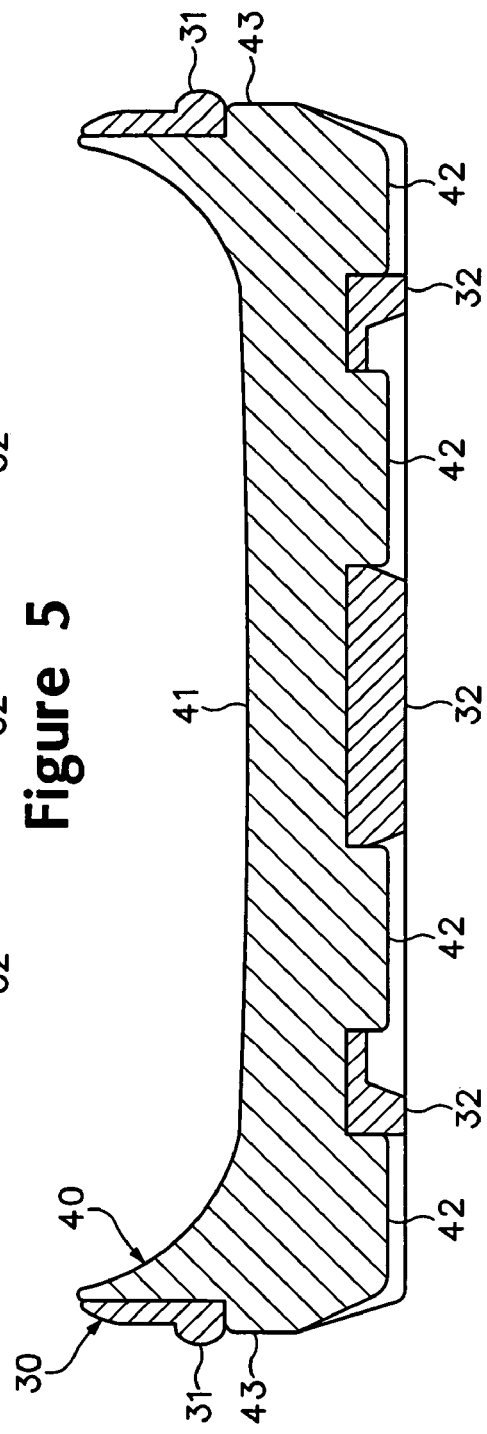

ARTICLE OF FOOTWEAR WITH A REMOVABLE MIDSOLE ELEMENT

BACKGROUND OF THE INVENTION

1. Field of the Invention

The present invention relates to footwear. The invention concerns, more particularly, an article of footwear with a removable and replaceable midsole element.

2. Description of Background Art

Conventional articles of footwear generally include two primary elements, an upper and a sole structure. The upper is secured to the sole structure and forms a void on the interior of the footwear for securely and comfortably receiving a foot. The upper is generally formed from multiple elements that are stitched and adhesively bonded together to form a comfortable structure for receiving the foot. More particularly, conventional footwear may include, for example, an exterior formed of leather and textile materials that are resistant to abrasion and provide the footwear with a particular aesthetic. Foam materials may be located on the interior of the upper to enhance the comfort of the upper, and moisture-wicking textiles may be positioned adjacent the foot to limit the quantity of perspiration within the upper.

The sole structure attenuates ground reaction forces and absorbs energy as the footwear contacts the ground, and often incorporates at least two discrete layers that are conventionally referred to as a midsole and an outsole. The midsole forms the middle layer of the sole and serves a variety of purposes that include controlling foot motions, such as pronation, and shielding the foot from substantial ground reaction forces. The outsole forms the ground-contacting element of footwear and is usually fashioned from a durable, wear resistant material that includes texturing to improve traction. The sole structure may also include an insole, which is a thin, cushioning member located within the upper and adjacent to a sole of the foot to enhance footwear comfort.

The upper and sole structure of most conventional articles of footwear are permanently secured together through adhesive bonding or stitching, for example. Accordingly, wear or damage occurring to either the upper or sole structure may require that the entire article of footwear be discarded. In addition, sole structures are generally configured for use during specific activities, particularly with athletic footwear. For example, a sole structure may incorporate pronation control elements that are beneficial for running, stability elements for court-style activities, or relatively soft cushioning for walking. A sole structure that is configured for one athletic activity, such as long-distance running, may not be suitable for use during another athletic activity, such as tennis. Each different type of sole structure, therefore, requires a distinct upper in footwear where the upper and sole structure are permanently secured together.

In contrast with the conventional article of footwear that includes a permanently secured upper and sole structure, footwear configurations embodying an upper and detachable sole structure have been proposed. U.S. Pat. No. 6,023,857 to Vizy et al. discloses footwear with a permanently attached upper and outsole that includes a separate midsole and heel counter structure, which is removable from the upper. U.S. Pat. No. 5,083,385 to Halford and U.S. Pat. No. 4,974,344 to Ching both disclose an outsole structure that is detachable from the remainder of the footwear. Finally, U.S. Pat. Nos. 6,023,859 and 5,799,417 to Burke et al. disclose an article of footwear with removable and exchangeable inserts that are positioned between the upper and a lower portion of the sole structure. The inserts protrude through the lower portion of the sole structure to provide a ground-contacting surface.

SUMMARY OF THE INVENTION

The present invention is an article of footwear having an upper, an outsole, and a midsole. The upper is configured to extend around at least a portion of a foot, and the outsole is secured to the upper. The outsole defines a plurality of apertures extending entirely through the outsole. In addition, the outsole has a ground-engaging surface positioned at a first elevation. The midsole is separate from the upper and the outsole. The midsole is also positionable within the upper such that a lower surface of the midsole extends into the apertures of the outsole and is exposed by the apertures. The lower surface is positioned at a second elevation, the first elevation being less than the second elevation.

The outsole form a web that extends between opposite sides of the upper, and the web defines the apertures. The outsole may also include a rim section that extends around a periphery of the footwear. In order to secure the midsole to the outsole, the midsole may include at least one flange that extends under the rim section. In some embodiments, the midsole includes a foot-supporting portion and a plurality of projections that extend downward from the foot-supporting portion. The projections have a configuration that extends into the apertures of the outsole and is exposed by the apertures. A lower surface of the foot-supporting portion may contact an upper surface of the outsole. An upper surface of the foot-supporting portion may also be contoured to include a raised periphery, and an insole may be positioned adjacent the upper surface of the midsole.

Another aspect of the invention pertains to a method of assembling an article of footwear. The method includes a step of providing a combination of an upper and an outsole that are secured together. A separate midsole is inserted into the upper such that a portion of the midsole extends through apertures formed by the outsole and are exposed by the apertures. The midsole is then positioned such that a lower surface of the midsole is at a greater elevation than a lower surface of the outsole.

The advantages and features of novelty characterizing the present invention are pointed out with particularity in the appended claims. To gain an improved understanding of the advantages and features of novelty, however, reference may be made to the following descriptive matter and accompanying drawings that describe and illustrate various embodiments and concepts related to the invention.

DESCRIPTION OF THE DRAWINGS

The foregoing Summary of the Invention, as well as the following Detailed Description of the Invention, will be better understood when read in conjunction with the accompanying drawings.

FIG. 5 is a first cross-sectional view of the article of footwear, as defined by section line 5-5 in FIG. 2.

FIG. 6 is a second cross-sectional view of the article of footwear, as defined by section line 6-6 in FIG. 2.

DETAILED DESCRIPTION OF THE INVENTION

Figure 1:
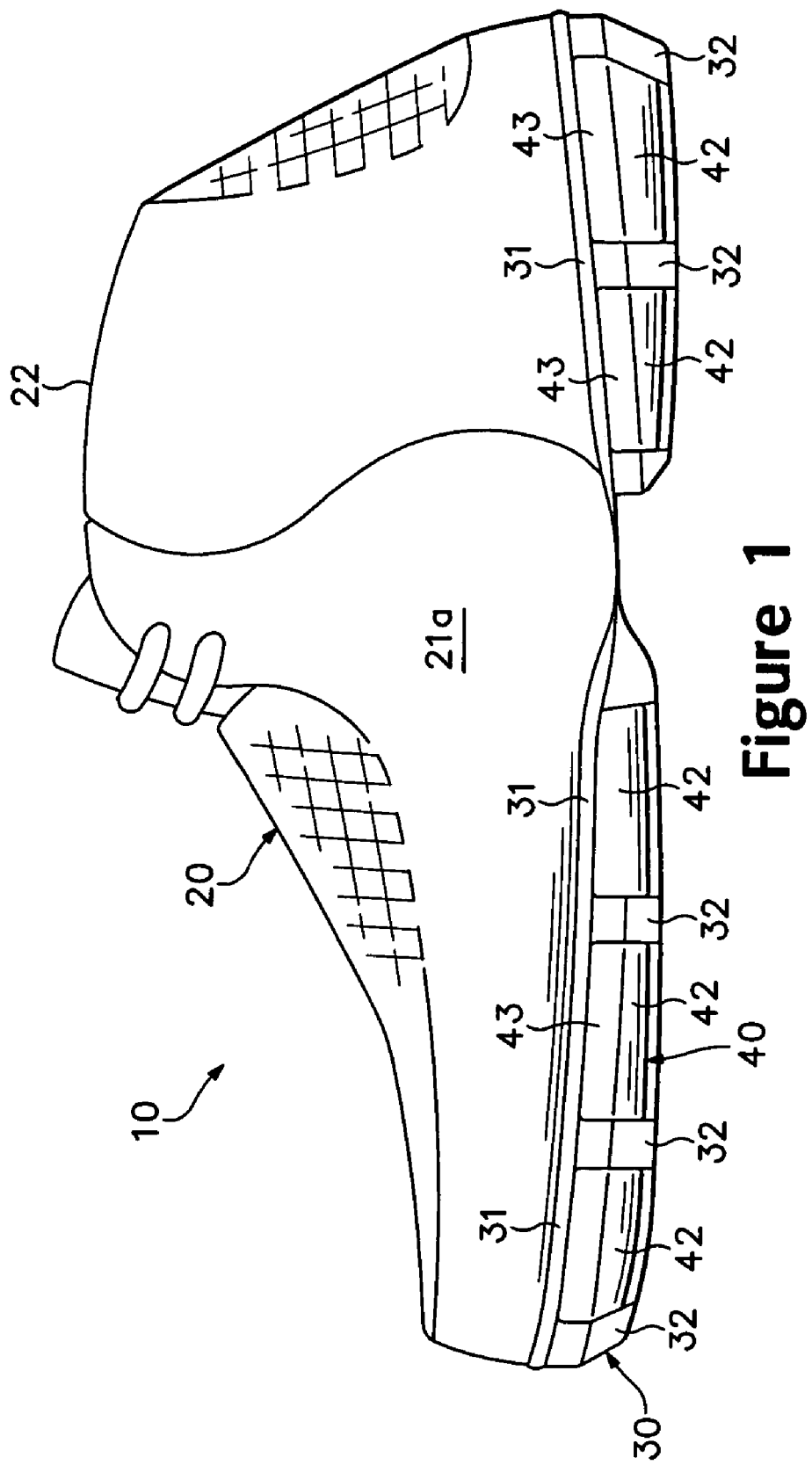
FIG. 1 is a side elevational view of an article of footwear in accordance with the present invention.
Figure 2:
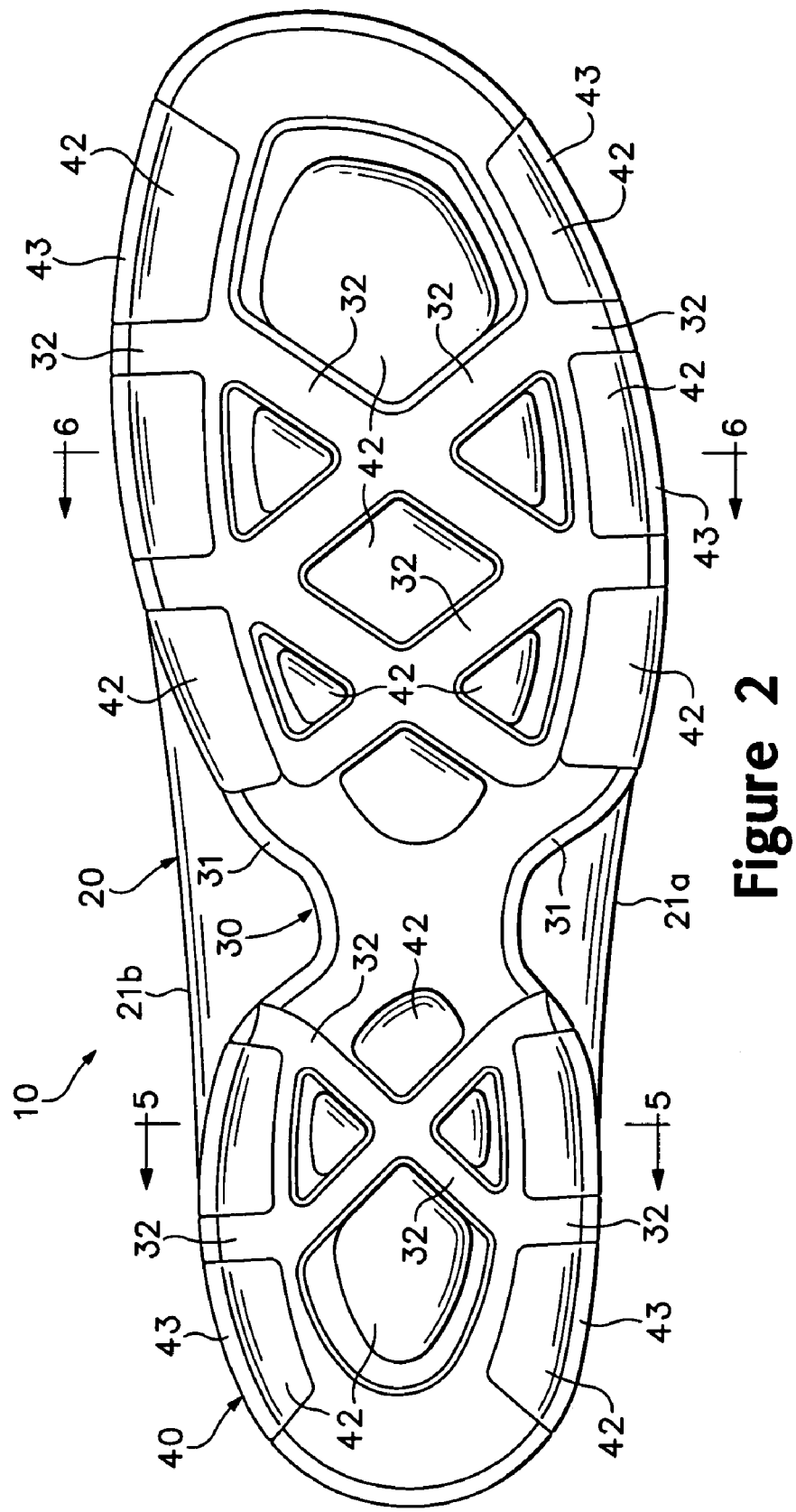
FIG. 2 is a bottom plan view of the article of footwear.
Figure 3:
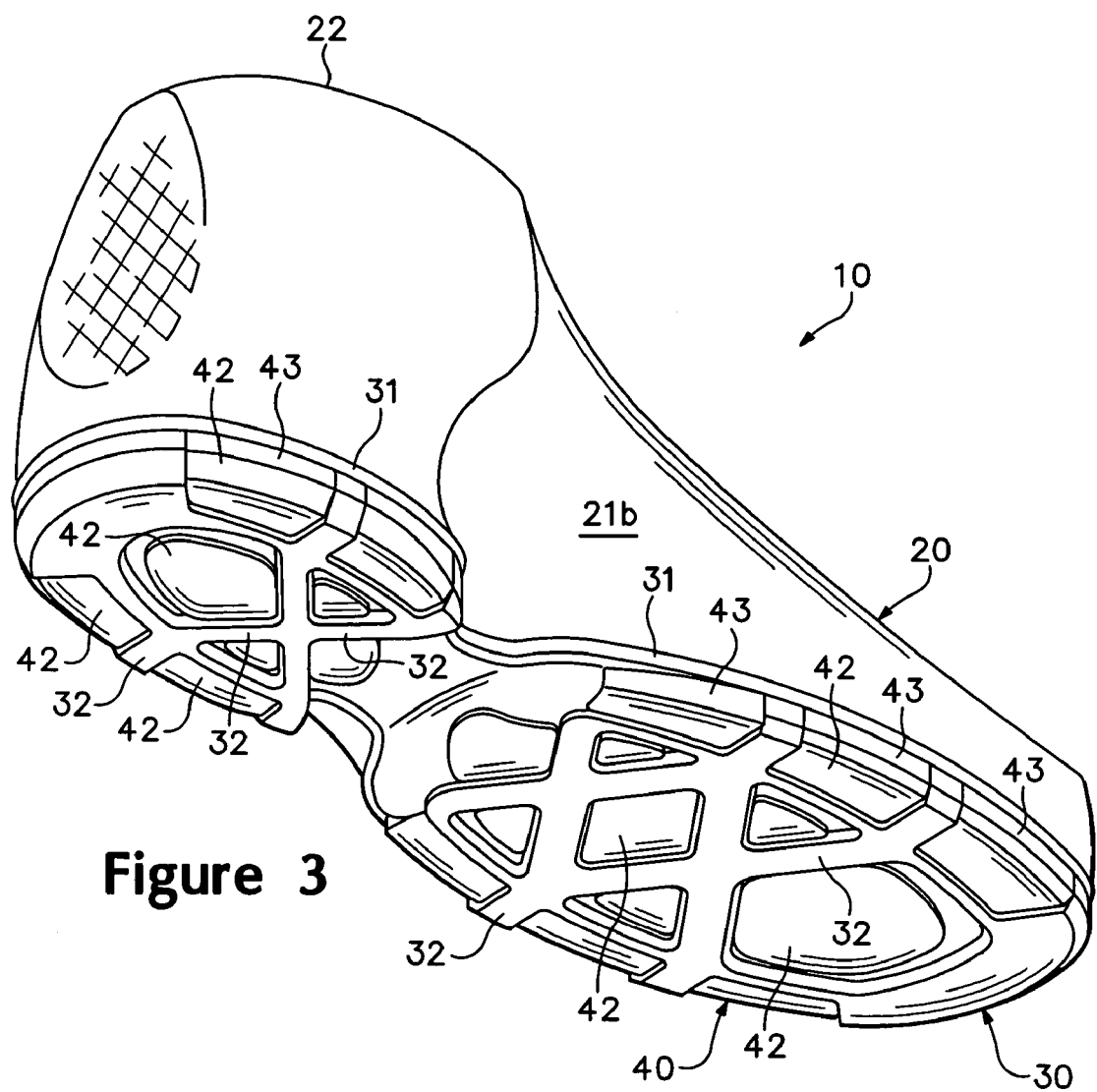
FIG. 3 is a perspective view of the article of footwear.
Figure 4:
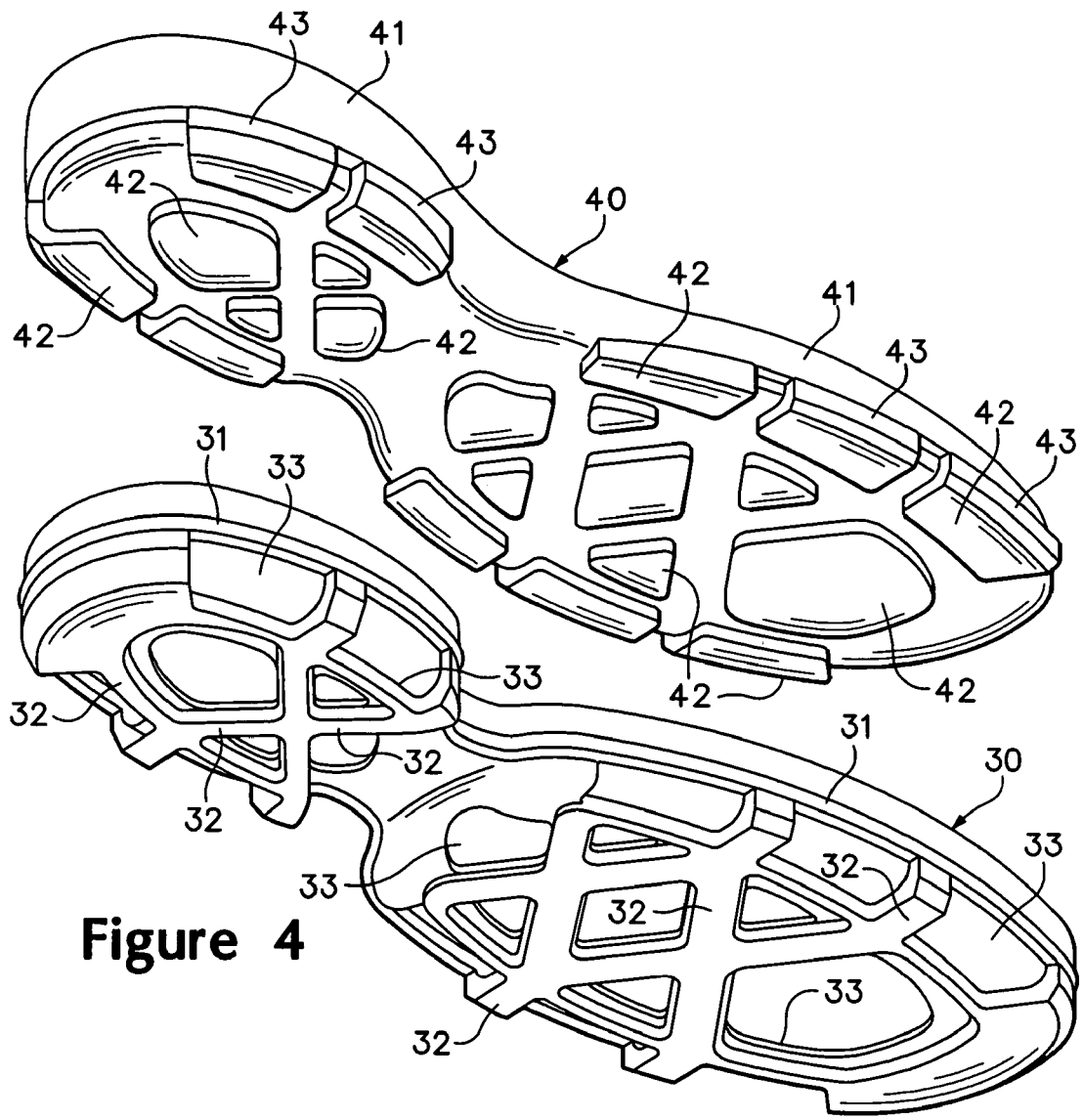
FIG. 4 is an exploded perspective view of the article of footwear.

The following discussion and accompanying FIGS. 1-6 disclose an article of footwear 10 having an upper 20, an outsole 30, a midsole 40 in accordance with the present invention. Upper 20 is secured to outsole 30 to form a single element. Midsole 40, however, is separable from the combination of upper 20 and outsole 30. This structure provides a plurality of advantages over the conventional, non-separable articles of footwear. For example, either midsole 40 or the combination of upper 20 and outsole 30 may be separately cleansed in a manner that best suits the respective materials forming each component. If one of midsole 40 or the combination of upper 20 and outsole 30 becomes worn or otherwise damaged, the damaged component may be replaced without the necessity of replacing the undamaged component, and the damaged component may be more easily recycled. Furthermore, midsole 40 or the combination of upper 20 and outsole 30 may be interchanged with alternate components to suit a particular activity or a preference of an individual.

Upper 20 exhibits a generally conventional structure incorporating a plurality of elements that are stitched or otherwise connected to form a comfortable structure for receiving the foot. Suitable materials for upper 20 include various textiles, foam, leather, and polymer materials that are stitched or adhesively bonded together. The textile materials, for example may include a mesh cloth that provides enhanced air-permeability and moisture-wicking properties. The foam materials may be a lightweight thermoset foam that conforms to the shape of the foot and enhances the comfort of footwear 10. Finally, the leather and polymer materials may be positioned in high-wear portions of upper 20, or in portions of upper 20 that require additional stretch-resistance or support. In some embodiments, and as depicted in the figures, upper 20 may be primarily formed from a synthetic leather material that is supplemented with woven structures that stretch and conform with the shape of the foot. Accordingly, upper 20 may be manufactured from generally conventional materials.

The various elements forming upper 20 define a lateral side 21a, an opposite medial side 21b, and an ankle opening 22. Lateral side 21a and medial side 21b generally cover the sides, heel, and instep portion of the foot, and may include laces or another adjustment system for tightening upper 20 around the foot and securing the foot within footwear 10. Lateral side 21a and medial side 21b define ankle opening 22 and extend downward from ankle opening 22 to join with outsole 30. Ankle opening 22 provides access to a void within upper 20 that accommodates both midsole 40 and the foot. Lateral side 21a, medial side 21b, and ankle opening 22 have, therefore, a generally conventional configuration. As discussed above, midsole 40 is separable from the combination of upper 20 and outsole 30. Ankle opening 22 provides, therefore, access to the void within upper 20 and also an area for removing and inserting midsole 40.

Outsole 30 is permanently secured to a lower portion of upper 20 to form a lower, ground-engaging surface of footwear 10. A variety of attachment techniques may be utilized for permanently securing outsole 30 to lateral side 21a and medial side 21b, including stitching, adhesive bonding, thermobonding, or a combination of stitching and bonding, for example. Outsole 30 may be a single element or a plurality of elements that are joined together. Suitable materials for outsole 30 include any of the various abrasion-resistant rubber materials that are conventionally utilized in footwear outsoles, including blown rubber, carbon rubber or a combination of blown and carbon rubbers. As utilized in the present document, the term "permanently secured" encompasses various securing techniques (e.g. stitching, adhesives, and thermobonding) that a consumer is not intended to modify.

Outsole 30 includes a rim section 31 and a plurality of elements 32 that define multiple apertures 33. Rim section 31 extends around the periphery of outsole 30 and is joined with upper 20, thereby permanently joining upper 20 and outsole 30 together. Elements 32 are relatively thin members that extend across a lower surface of footwear 10 to provide portions of outsole 30 that engage the ground. More particularly, elements 32 extend generally from lateral side 21a to medial side 21b, for example, and are spaced to define the various apertures 33 and expose a lower surface of midsole 40. That is, elements 32 generally form a web structure in outsole 30. Apertures 33, as depicted in the figures, exhibit generally rectangular, triangular, and diamond-shaped configurations. In further embodiments of the invention, however, apertures 33 may exhibit a variety of other shapes or combinations of shapes, including circular, oval, hexagonal, octagonal, square, or other geometrical or non-geometrical shapes, for example. Accordingly, the specific shape of apertures 33 may vary considerably within the scope of the present invention.

Figure 7:
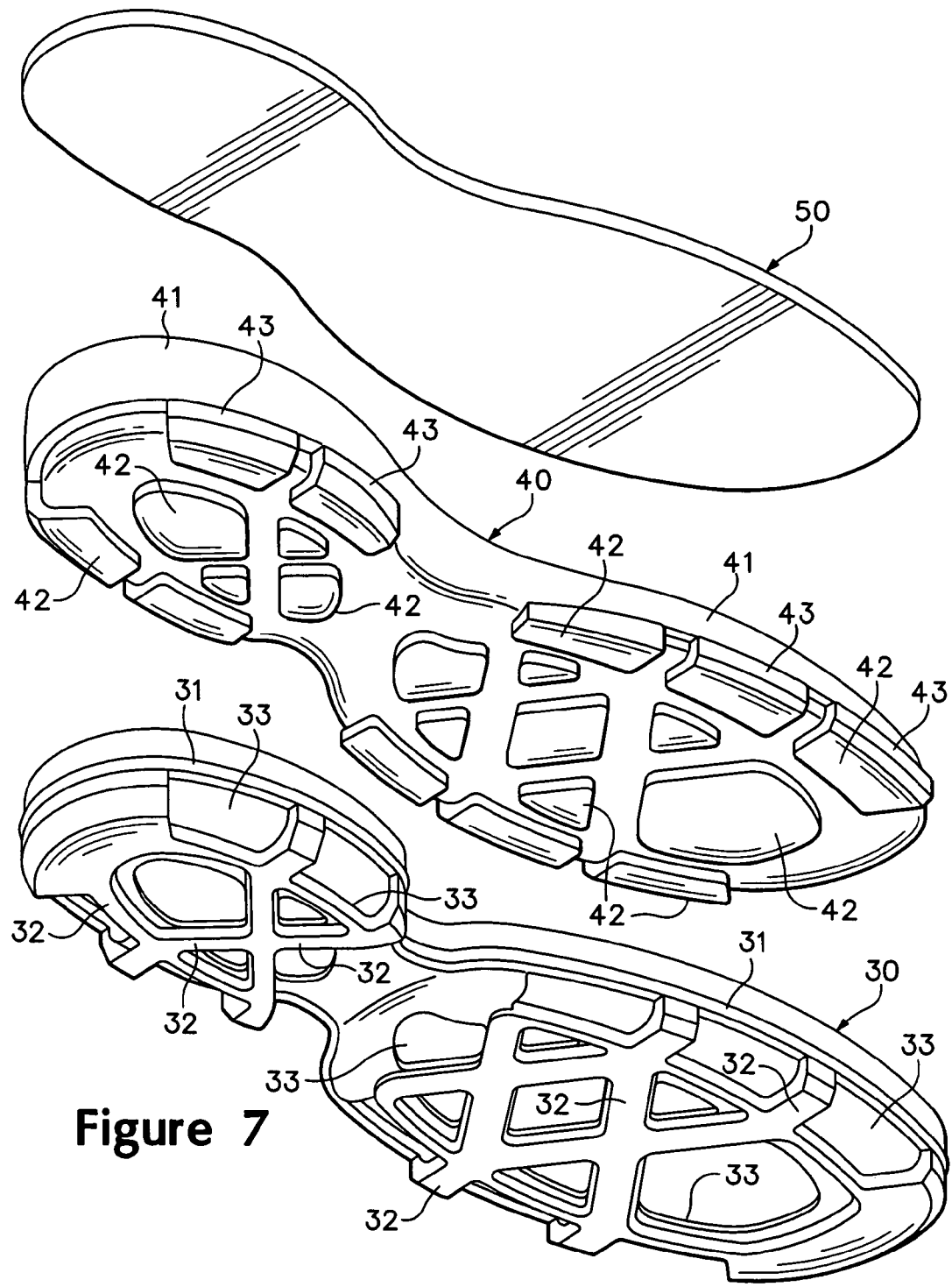
FIG. 7 is an exploded perspective view of another embodiment of the article of footwear.

Midsole 40 is separable from the combination of upper 20 and outsole 30 by disengaging midsole 40 from outsole 30 and drawing midsole 40 through ankle opening 22, thereby removing midsole 40 from the void formed within upper 20. The primary elements of midsole 40 are a foot-supporting portion 41 and a plurality of projections 42. Foot-supporting portion 41 extends from a heel portion to a forefoot portion of footwear 10 and provides an upper surface for contacting and supporting the foot. The upper surface of foot-supporting portion 41 may be contoured to conform with a natural shape of the foot. Peripheral areas of foot-supporting portion 41 may also be raised to form a general depression in the upper surface of midsole 40, thereby providing an area for securely receiving the foot. In order to enhance the comfort of midsole 40, a generally conventional insole 50 may extend over the upper surface of foot-supporting portion 41, as depicted in FIG. 7. That is, insole 50 may be positioned to extend between midsole 40 and the foot, and insole 50 may also be removable in the same general manner as midsole 40.

A lower surface of foot-supporting portion 41 contacts the various elements 32 when midsole 40 is received by the combination of upper 20 and outsole 30. In addition, projections 42 extend downward and into apertures 33. Projections 42 exhibit the general shape of apertures 33. Those projections 42 that are located in peripheral areas of midsole 40, however, may include a flange 43 that extends under rim section 31 to secure midsole 40 in position relative to outsole 30. In addition to extending downward, those projections 42 that are located in peripheral areas of midsole 40 also extend laterally to form flanges 43. In combination with outsole 30, flanges 43 extend under rim section 31 to secure the position of midsole 40.

Midsole 40 is formed of a polymer foam material that provides cushioning as footwear 10 contacts the ground. More specifically, midsole 40 operates to attenuate ground reaction forces and absorb energy as midsole 40 is compressed between the foot and the ground. This may occur, for example, during various ambulatory activities that involve either walking or running. Suitable materials for midsole 40 are, therefore, any of the conventional polymer foams that are utilized in the midsoles of athletic footwear, such as ethylvinylacetate and polyurethane foam. Midsole 40 may also incorporate a fluid-filled bladder in the heel portion or along the entire length of foot-supporting portion 41 in order to provide additional cushioning, as disclosed in U.S. Pat. Nos.

4,183,156; 4,219,945; 4,906,502; and 5,083,361 to Marion F. Rudy and U.S. Pat. Nos. 5,993,585 and 6,119,371 to David A. Goodwin et al., for example.

When midsole 40 is properly positioned within upper 20 and joined with outsole 30, projections 42 extend downward and into apertures 33. The shapes of projections 42 generally correspond with the shapes of apertures 33 to provide a secure connection between outsole 30 and midsole 40. The secure connection ensures, for example, that midsole 40 remains properly positioned relative to upper 20 during walking, running, or other ambulatory activities. The secure connection also ensures that debris (e.g., dirt, stones, twigs) do not enter upper 20 through apertures 33. In order to enhance the secure connection, flanges 43 extend under rim section 31, as discussed above. The combination of flanges 43 and rim section 31 discussed above provides an example of a mechanical locking system that is suitable for footwear 10. In some embodiments, a locking system may not be necessary to form a secure connection between sole structure 30 and upper 20. In other embodiments, a friction fit between outsole 30 and midsole 40, various pins that extend through outsole 30 and into midsole 40, or a temporary adhesive may be utilized. Accordingly, the use of an aperture edge and flange (i.e., rim section 31 and flanges 43) is not the only type of mechanical locking system that may be utilized to form a secure connection between sole structure 30 and upper 20.

Projections 42 extend downward and into apertures 33, and projections 42 are exposed by apertures 33. Although projections 42 extend downward and into apertures 33 and are exposed, a lower surface of the various projections 42 remains at a higher elevation than a lower surface of elements 32. This configuration ensures that outsole 30 is the primary element of footwear 10 that contacts or otherwise engages the ground. If, for example, the lower surface of the various projections 42 was at a lower elevation than the lower surface of elements 32, then midsole 40 would provide the primary ground-engaging element of footwear 10 and would be subject to considerable abrasive forces. As discussed above, however, outsole 30 is formed from an abrasion-resistant rubber material, whereas midsole 40 is formed from a polymer foam. Outsole 30 is, therefore, formed from a material that is more capable of withstanding the abrasive forces associated with walking, running, or other ambulatory activities. In some embodiments of the invention, however, the lower surface of projections 42 may be covered by an abrasion-resistant material to enhance the durability of midsole 40.

Although the lower surface of the various projections 42 remains at a higher elevation than a lower surface of elements 32, the lower surface of the various projections 42 may still contact the ground as outsole 30 and midsole 40 are compressed between the foot and the ground. A majority of the abrasive forces associated with walking, running, or other ambulatory activities, however, may still be absorbed by outsole 30. Accordingly, the difference in elevations between outsole 30 and the lower surface of the various projections 42 is not intended to prevent midsole 40 from contacting the ground. Rather, the difference in elevations operates to limit the degree to which the abrasive forces wear or otherwise degrade midsole 40.

The structure of footwear 10 described above provides a variety of advantages over conventional footwear, wherein the sole is permanently attached to the upper. During running, for example, some individuals may prefer a sole structure that limits the degree to which the foot pronates upon contact with the ground. The same individual, however, may prefer a sole structure that exhibits a high degree of stability during court-style activities, such as basketball or tennis. Rather than purchase multiple pairs of upper-sole structure combinations that are permanently secured together, the individual may acquire the combination of upper 20 and outsole 30, and the individual may acquire multiple midsoles 40, each midsole 40 being suitable for different activities. The individual may then select one of the multiple midsoles 40 for use with the combination of upper 20 and outsole 30. Similarly, the individual may acquire multiple combinations of upper 20 and outsole 30 for use with a single midsole 40.

The combination of upper 20 and outsole 30 includes different materials than midsole 40. Whereas midsole 40 is formed primarily from a polymer foam material, the combination of upper 20 and outsole 30 are formed from different materials. The respective portions of footwear 10 may benefit, therefore, from cleansing techniques that are specifically suited to their respective materials. Accordingly, the combination of upper 20 and outsole 30 may be separated from midsole 40 and each may be cleansed in an appropriate manner.

Midsole 40 is formed from a polymer foam material. Following significant use, the various cells within the polymer foam material may experience compression set or otherwise degrade, or midsole 40 may become significantly worn. Rather than dispose of footwear 10, midsole 40 may be properly recycled and replaced with an alternate midsole 40, thus extending the lifespan of footwear 10. Similar considerations apply to the combination of upper 20 and outsole 30.

With regard to recycling, a significant portion of footwear 10 and many conventional articles of footwear is the midsole. As discussed above, the midsole of conventional articles of footwear is permanently secured to the upper and outsole. This configuration increases the difficulty of recycling the midsole or other footwear components. In footwear 10, however, midsole 40 is separable from the combination of upper 20 and outsole 30. In comparison with the conventional footwear, therefore, midsole 40 may be recycled with significantly greater efficiency.

From an aesthetic viewpoint, the interchangeability of midsole 40 and the combination of upper 20 and outsole 30 also provides the individual with the ability to customize the appearance of footwear 10. For example, footwear 10 may be purchased with a first color combination. By interchanging midsole 40 with an alternate midsole 40, for example, the color combination of footwear 10 may be customized to the preferences of the individual. Support for a particular athletic team, for example, may also be demonstrated by selecting midsole 40 and the combination of upper 20 and outsole 30 to reflect the colors of the athletic team.

The present invention is disclosed above and in the accompanying drawings with reference to a variety of embodiments. The purpose served by the disclosure, however, is to provide an example of the various features and concepts related to the invention, not to limit the scope of the invention. One skilled in the relevant art will recognize that numerous variations and modifications may be made to the embodiments described above without departing from the scope of the present invention, as defined by the appended claims.

That which is claimed is:

1. An article of footwear comprising:
   an upper for extending around at least a portion of a foot;
   an outsole that is permanently secured to the upper and defines a plurality of apertures extending entirely through the outsole, the outsole having a ground-engaging surface positioned at a first elevation; and
   a midsole positioned within the upper such that a lower surface of the midsole extends into the apertures of the outsole and is exposed by the apertures, wherein the lower surface is at a second elevation, the first elevation is less than the second elevation, and the midsole is non-destructively separable from the permanently secured outsole and upper, wherein the outsole includes a rim section that extends around a periphery of the footwear, and wherein the midsole portion extending downwardly into the apertures around the periphery of the footwear includes at least one flange that extends laterally from a side portion of the midsole through the at least one outsole aperture and under the rim section to secure the midsole to the outsole.

2. The article of footwear recited in claim 1, wherein the outsole forms a web that extends between opposite sides of the upper, and the web defines the apertures.

3. The article of footwear recited in claim 1, wherein the midsole includes a foot-supporting portion and a plurality of projections that extend downward from the foot-supporting portion, the projections having a configuration that extends into the apertures of the outsole and is exposed by the apertures.

4. The article of footwear recited in claim 3, wherein a lower surface of the foot-supporting portion contacts an upper surface of the outsole.

5. The article of footwear recited in claim 3, wherein an upper surface of the foot-supporting portion is contoured to include a raised periphery.

6. The article of footwear recited in claim 1, further including an insole positioned adjacent an upper surface of the midsole.

7. The article of footwear of claim 1, wherein the midsole is a unitary member extending substantially the entire length of the article.

8. The article of footwear of claim 1, wherein the at least one flange forms an exposed peripheral corner having an exposed side face positioned on a side portion of the outsole and an exposed lower face positioned on a bottom portion of the outsole and configured to contact the ground when the article is worn on a human foot.

9. The article of footwear of claim 1, wherein the midsole portion extending through the apertures includes a plurality of non-contiguous projections extending through apertures distributed around the periphery of the outsole, each of the projections distributed around the periphery forming an exposed peripheral corner having an exposed side face positioned on a side portion of the outsole and an exposed lower face positioned on a bottom portion of the outsole and configured to contact the ground when the article is worn on a human foot.

10. An article of footwear comprising:
an upper for extending around at least a portion of a foot;
an outsole that is permanently secured to the upper and defines a plurality of apertures extending entirely through the outsole, the outsole having a ground-engaging surface positioned at a first elevation; and
a midsole that is non-destructively separable from the permanently secured upper and the outsole, the midsole including a foot-supporting portion and a plurality of projections that extend downward from the foot-supporting portion, the midsole being positionable within the upper such that the projections extend into the apertures of the outsole and a lower surface of the projections are exposed by the apertures, the lower surface being at a second elevation, the first elevation being less than the second elevation, and at least one of the projections is located at a periphery of footwear and extends downward and includes a flange that extends laterally from a side portion of the midsole and under a portion of the outsole to secure the midsole to the outsole.

11. The article of footwear recited in claim 10, wherein the outsole forms a web that extends between opposite sides of the upper, and the web defines the apertures.

12. The article of footwear recited in claim 10, wherein the outsole includes a rim section that extends around a periphery of the footwear.

13. The article of footwear recited in claim 10, wherein a lower surface of the foot-supporting portion contacts an upper surface of the outsole.

14. The article of footwear recited in claim 10, wherein an upper surface of the foot-supporting portion is contoured to include a raised periphery.

15. The article of footwear recited in claim 10, further including an insole positioned adjacent an upper surface of the midsole.

16. The article of footwear of claim 10, wherein the midsole is a unitary member extending substantially the entire length of the article.

17. An article of footwear comprising:
an upper having an ankle opening, a pair of side portions extending downward from the ankle opening;
an outsole permanently secured to the upper, the outsole being located opposite the ankle opening and extending between the side portions, the outsole forming a ground-engaging element of the footwear, and the outsole defining an aperture that extends entirely through the outsole; and
a midsole having a foot-supporting portion and a projection extending from the foot-supporting portion, the midsole being insertable through the ankle opening and installable such that the foot-supporting portion is positioned adjacent an upper surface of outsole and the projection extends through the aperture, a lower surface of the projection being positioned at a greater elevation than a lower surface of the outsole,
wherein the midsole is non-destructively separable from the permanently secured outsole and upper after installation, and
wherein a portion of the projection extends downwardly and a portion extends laterally from a side portion on of the midsole and under a portion of the outsole to secure the midsole to the outsole.

18. The article of footwear recited in claim 17, wherein the outsole includes a rim section that extends around a periphery of the footwear.

19. The article of footwear recited in claim 18, wherein the portion of the projection that extends laterally from a side poison of the midsole is a flange that extends under the rim section to secure the midsole to the outsole.

20. The article of footwear recited in claim 17, further including an insole positioned adjacent an upper surface of the foot-supporting portion.

21. The article of footwear of claim 17, wherein the midsole is a unitary member extending substantially the entire length of the article.

22. An article of footwear comprising:
a combination of an upper permanently secured to an outsole; and
a midsole that is non-destructively separable from the combination, the combination defining a void located on an interior of the footwear, the void having a shape and a size that accommodates both the midsole and a foot, and the combination defining a plurality of apertures that extend through a bottom portion of the combination, the midsole having a foot-supporting portion positioned on an interior of the combination, and the midsole having a plurality of projections secured to the foot-supporting portion, the projections extending into the apertures such that a lower surface of the projections are at a greater elevation than a lower surface of the combination, and the combination forming a ground-engaging portion of the footwear, wherein the combination includes a rim section that extends around a periphery of the footwear, and wherein the midsole includes projections around the periphery extending downward and having at least one flange that extends laterally from a side portion of the midsole and under the rim section to secure the midsole to the combination.

23. The article of footwear of claim 22, wherein the midsole is a unitary member extending substantially the entire length of the article.

24. A method of modifying an article of footwear, the method comprising steps of:

removing a midsole from an upper that is permanently secured to an outsole, wherein prior to removal the midsole includes portions extending through and exposed by apertures formed in the outsole;

inserting a replacement midsole into the upper, wherein the replacement midsole has a shape similar to the removed midsole, and wherein portions of the replacement midsole extend through the apertures formed in the outsole and are exposed by the apertures; and positioning the replacement midsole such that a lower surface of the replacement midsole is at a greater elevation than a lower surface of the outsole, wherein the step of positioning includes locating a flange portion the replacement midsole, extending laterally from a side portion of the midsole, under a rim section of the outsole to secure the replacement midsole to the outsole, the rim section forming at least a portion of a periphery of the outsole.

25. The method recited in claim 24, wherein the step of inserting includes placing the replacement midsole into the upper through an ankle opening of the upper.

* * * * *

UNITED STATES PATENT AND TRADEMARK OFFICE
CERTIFICATE OF CORRECTION

| | |
|---|---|
| PATENT NO. | : 7,451,557 B2 |
| APPLICATION NO. | : 10/862056 |
| DATED | : November 18, 2008 |
| INVENTOR(S) | : Steven McDonald et al. |

Page 1 of 1

It is certified that error appears in the above-identified patent and that said Letters Patent is hereby corrected as shown below:

On the Title Pg On page 2, References Cited Item (56):
 Please replace "2003/0051972" with --2003/0051372--

In column 8, Claim 17, Line 41:
 Please replace "portion on of the" with --portion of the--

In Column 10, Claim 24, Line 12:
 Please replace "portion the replacement" with --portions of the replacement--

Signed and Sealed this

Fourteenth Day of July, 2009

JOHN DOLL
*Acting Director of the United States Patent and Trademark Office*